US006531220B1

(12) United States Patent
Kweon et al.

(10) Patent No.: US 6,531,220 B1
(45) Date of Patent: *Mar. 11, 2003

(54) POSITIVE ACTIVE MATERIAL FOR RECHARGEABLE LITHIUM BATTERY AND METHOD OF PREPARING SAME

(75) Inventors: Ho-Jin Kweon, Cheonan-si (KR); Hyun-Sook Jung, Cheonan-si (KR); Geun-Bae Kim, Cheonan-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/556,638

(22) Filed: Apr. 24, 2000

(30) Foreign Application Priority Data

Jun. 17, 1999 (KR) .............................. 99-22766

(51) Int. Cl.$^7$ ................................. B32B 5/16
(52) U.S. Cl. ................. 428/402; 428/403; 428/404; 429/224; 429/221; 429/231.1; 429/231.2; 429/231.6
(58) Field of Search ................... 428/402, 403, 428/404; 429/224, 221, 231.1, 231.2, 231.6

(56) References Cited

U.S. PATENT DOCUMENTS 6,071,649 A * 6/2000 Mao .................. 429/231.3
6,051,340 A * 9/2000 Kawakami ............ 429/231.95
6,183,911 B1 * 2/2001 Kweon .................. 429/224
6,190,800 B1 * 2/2001 Iltchev .................. 429/224
6,277,521 B1 * 8/2001 Gao .................... 429/231.1
6,322,744 B1 * 11/2001 Kelley .................. 264/446

* cited by examiner

Primary Examiner—Leszek Kiliman
(74) Attorney, Agent, or Firm—Blakely Sokoloff Taylor & Zafman

(57) ABSTRACT

A positive active material for a rechargeable lithium battery is provided. The active material includes a manganese-based compound selected from the group consisting of the compounds represented by the formulas 1 to 6. The surface of the active material is coated with metal oxide.

$Li_xMn_{1-x}M'_xA_2$     (1)

$Li_xMn_{1-x}M'_xO_{2-z}A_z$     (2)

$Li_xMn_{1-x-y}M'_xM''_yA_2$     (3)

$Li_xMn_{2-x}M'_xO_4$     (4)

$Li_xMn_{2-x}M'_xO_{4-z}A_z$     (5)

$Li_xMn_{2-x-y}M'_xM''_yA_4$     (6)

(where, $0.01 \leq x \leq 0.1$, $0.01 \leq y \leq 0.1$, $0.01 \leq z \leq 0.5$, M' is at least one semi-metal selected from Si, B, Ti, Ga, Ge or Al, M" is at least one transition metal or lanthanide metal selected from Al, Cr, Co, Mg, La, Ce, Sr or V, and A is selected from O, F, S or P.)

6 Claims, 3 Drawing Sheets

POSITIVE ACTIVE MATERIAL FOR RECHARGEABLE LITHIUM BATTERY AND METHOD OF PREPARING SAME

CROSS REFERENCE TO RELATED APPLICATION

This application is based on application No. 99-22766 filed in the Korean Industrial Property Office on Jun. 17, 1999, the content of which is incorporated hereinto by reference.

BACKGROUND OF THE INVENTION (a) Field of the Invention

The present invention relates to a positive active material for a rechargeable lithium battery and a method of preparing the same and, more particularly, to a positive active material for a rechargeable lithium battery which exhibits good cycle life characteristics.

(b) Description of the Related Art

Rechargeable lithium batteries employ materials into or from which lithium ions are intercalated or deintercalated as negative and positive active materials.

For the negative active material in a rechargeable lithium battery, metallic lithium has been used. However, lithium metal has good reactivity toward electrolyte and deposits to form a dendric layer which induces short circuit between the negative and positive active material. There are at least two disadvantageous effects that arise from the reaction of lithium with electrolyte: the exothermic liberation of heat and the formation of passive films on lithium has been shown to be one reason for the loss of capacity of lithium cells on repeated cycling.

The problem of lithium reactivity toward the electrolyte is addressed by replacing lithium metal with carbon-based materials. With the use of carbon-based active materials, the potential safety problem present in metallic lithium-based batteries can be prevented while achieving a relatively higher energy density as well as the reasonable shelf life.

For the positive active material in the rechargeable lithium battery, chalcogenide compounds into or from which lithium ions are inserted or extracted are used. Typical examples include $LiCoO_2$, $LiMn_2O_4$, $LiNiO_2$, $LiNi_{1-x}Co_xO_2(0<X<1)$ or $LiMnO_2$. $LiCoO_2$ is widely used as it has an electrical conductivity of about $10^{-2}$ to 1 S/cm at room temperature and high battery voltage, but has poor safety characteristics during high rate charges and discharges. $LiNiO_2$ has a high charge capacity, but is difficultly produced. Manganese-based material such as $LiMn_2O_4$ or $LiMnO_2$, etc. has low capacities but is easiest to prepare, is less expensive than the other materials and has environmentally friendly characteristics.

However, when a battery using the manganese-based materials such as $LiMn_2O_4$ is charged and discharged for a long time, particularly, at a high temperature, side reaction between an electrolyte and the manganese-based material occurs at the surface of the manganese-based material. It is believed that $H_2O$ reacts with $LiPF_6$ in an electrolyte to generate strong acid HF which attacks to Mn presented in a surface of the manganese-based active material and the attacked Mn is eluted into the electrolyte. The eluted Mn is dissolved in the electrolyte and the active material is disintegrated. The side reaction seriously deteriorates the cycle life characteristics of the battery.

The attempt to solve this problem has been by synthesizing a material including 1 or more equivalent of Li or partially substituting oxygen with F in a spinel manganese-based material. However, the methods do not effectively improve the cycle life characteristics of the battery, particularly, at high temperature.

SUMMARY OF THE INVENTION

It is an object of the present invention to provide a positive active material for a rechargeable lithium battery which exhibits good cycle life characteristics, particularly at high temperature.

It is still another object to provide a method of preparing the positive active material for the rechargeable lithium battery.

These and other objects may be achieved by the positive active material for a rechargeable lithium battery including a manganese-based compound selected from the group consisting of compounds represented by formulas 1 to 6. The surface of the active material is coated with metal oxide.

$Li_xMn_{1-x}M'_xA_2$            (1)

$Li_xMn_{1-x}M'_xO_{2-z}A_z$            (2)

$Li_xMn_{1-x-y}M'_xM''_yA_2$            (3)

$Li_xMn_{2-x}M'_xO_4$            (4)

$Li_xMn_{2-x}M'_xO_{4-z}A_z$            (5)

$Li_xMn_{2-x-y}M'_xM''_yA_4$            (6)

where, $0.01 \leq x \leq 0.1$, $0.01 \leq y \leq 0.1$, $0.01 \leq z \leq 0.5$, M' is at least one semi-metal selected from Si, B, Ti, Ga, Ge or Al, M" is at least one transition metal or lanthanide metal selected from Al, Cr, Co, Mg, La, Ce, Sr or V, and A is selected from O, F, S or P.

The present invention further includes a method of preparing a positive active material for a rechargeable lithium battery. In this method, a manganese-based material selected from the group consisting of formulas 1 to 6 is obtained. The material is coated with a metallic alkoxide solution or metal aqueous solution. The coated powder is then heat-treated such that the coated powder is converted into a metal oxide-coated powder.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
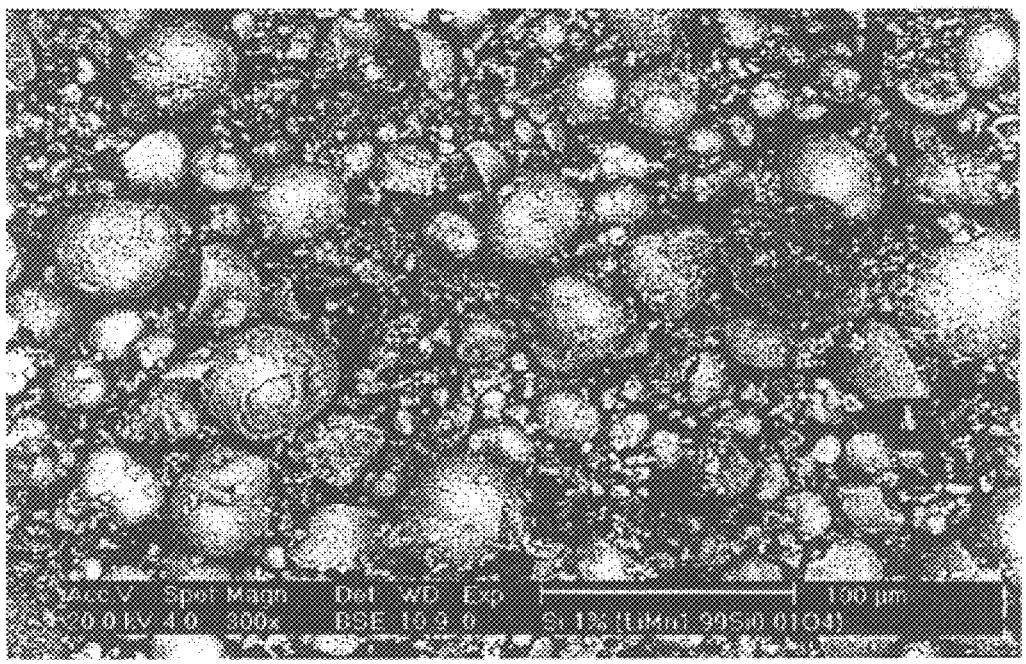
FIG. 1 is a scanning electron microscope (SEM) photograph of a positive active material for a rechargeable lithium battery according to Example of the present invention.

A positive active material of the present invention belongs to a manganese-based material such as $LiMn_2O_4$ which has environmentally friendly characteristics and is less expensive than the other materials. The surface of the positive active material is coated with metal oxide. The positive active material includes an active material for 3V-battery represented by the formulas 1 to 3 or an active material for 4V-battery represented by the formulas 4 to 6.

$$Li_xMn_{1-x}M'_xA_2 \quad (1)$$

$$Li_xMn_{1-x}M'_xO_{2-z}A_z \quad (2)$$

$$Li_xMn_{1-x-y}M'_xM''_yA_2 \quad (3)$$

$$Li_xMn_{2-x}M'_xO_4 \quad (4)$$

$$Li_xMn_{2-x}M'_xO_{4-z}A_z \quad (5)$$

$$Li_xMn_{2-x-y}M'_xM''_yA_4 \quad (6)$$

(where, $0.01 \leq x \leq 0.1$, $0.01 \leq y \leq 0.1$, $0.01 \leq z \leq 0.5$, M' is at least one semi-metal selected from Si, B, Ti, Ga, Ge or Al, M'' is at least one transition metal or lanthanide metal selected from Al, Cr, Co, Mg, La, Ce, Sr or V, and A is selected from O, F, S or P.)

For synthesizing a compound represented by the formulas 1 to 6, lithium salts, manganese compounds and semi-metal salts are mixed in a desirable equivalent ratio. The lithium salt may be any one of lithium salts known in the related arts. The exemplary of the lithium salt are lithium nitrate, lithium acetate or lithium hydroxide. The manganese compound may be any one of manganese compound known in the related arts. The exemplary of the manganese compound are manganese acetate or manganese dioxide. The semi-metal salt may be at least one semi-metal selected from Si, B, Ti, Ga, Ge or Al. The amount of the semi-metal is 0.01 to 10 wt % of the active material. If the amount of the semi-metal is less than 0.01 wt %, the addition effect of semi-metal to an active material is not induced. Whereas, the amount of the semi-metal is more than 10 wt %, the excess semi-metal may be impurity and the adverse effect may be obtained.

At this time, in order to facilitate the reaction of lithium salts, manganese compounds and semi-metal salts, a solvent is added to the mixture. The solvent may be ethanol, methanol, water, and acetone. And then, the mixture is mortar grinder mixed until a solvent-free condition is reached.

The resulting mixture is heat-treated at about 400 to 600° C. to produce semi-crystalline manganese-based compound powder. If the temperature is less than 400° C., manganese compounds, semi-metal salts do not completely react with lithium salts. Alternatively, a first heat-treating is performed at 400 to 600° C. and a second heat-treating is performed at 700 to 900° C. for about 10 to 15 hours. If the first heat-treating temperature is less than 400° C., manganese compounds, semi-metal salts do not completely react with lithium salts. Whereas, if the second heat-treated temperature is less than 700° C., it is difficult to form a crystalline material. The heat-treating step is performed by increasing temperature at a rate of 1 to 5° C./min under conditions of circulating dry air or oxygen. The mixture is allowed to stand at the first or second heat-treating temperature for a predetermined time and cooled. As a result, a powder of a compound selected from the group consisting of the compounds represented by the formulas 1 to 6 is obtained.

The powder may be re-mixed at room temperature to uniformly distribute lithium salt in the powder.

The manganese-based compound powder is coated with a metallic alkoxide solution or a metal aqueous solution. The coating method may include a sputtering technique, a chemical vapor deposition (CVD), dip coating and other general-purpose coating techniques. Among the techniques, the dip coating technique may be preferably used for coating the metallic alkoxide solution or the metal aqueous solution onto the powder. The metallic alkoxide solution is prepared by the reaction of an alcohol with metal of 1 to 10 wt % of the alcohol. The metal may be Mg, Al, Co, K, Na, Ca, Si, Ti or V, preferably Mg. The preferable alcohol is methanol or ethanol. The metal aqueous solution may be vanadium oxide ($V_2O_5$) aqueous solution. The vanadium oxide aqueous solution is prepared by the refluxing water with vanadium oxide of 1 to 10 wt % of water.

When metal is less than 0.1 wt % of water or alcohol, the coating effect of the metallic alkoxide solution or metal aqueous solution onto the powder is not induced. In contrast, when metal is more than 10 wt % of water or alcohol, the coating layer of the metallic alkoxide solution or metal aqueous solution becomes undesirably thick.

The coated powder is dried at 120° C. for 5 hours in an oven. The drying step is performed to uniformly distribute lithium salt in the powder. Thereafter, the dried powder is heat-treated at 300 to 800° C. for 2 to 20 hours. The heating step is preferably performed under dry air or oxygen. When the heat-treating temperature is lower than 300° C., the metallic alkoxide solution or the metallic aqueous solution coated on the powder is not crystallized, and the free movement of lithium ions through the active material is restricted.

According to the heat-treating step, metallic alkoxide solution or metal aqueous solution is converted into metal oxide. In this way, a metal oxide-coated active material is prepared. It is preferable that the thickness of the metal oxide is up to 1 to 100 nm. When the thickness of the metal oxide layer is less than 1 nm, the effect of coating metal oxide onto the powder is not induced. In contrast, the thickness of the metal oxide layer is more than 100 nm, the coating layer becomes undesirably thick.

The metal oxide formed on the surface of the powder may be derived from a single source of the metallic alkoxide solution or metal aqueous solution, or from composite sources of manganese and metallic alkoxide solution or metal aqueous solution. For example, $LiMn_2O_4$ can be coated with aluminum alkoxide sol and then this alkoxide-coated $LiMn_2O_4$ is heat-treated to produce a positive active material coated with composite metal oxide of manganese and aluminum and/or aluminum oxide.

The semi-metal in the active material of the present invention has good reactivity with HF. Generally, an electrolyte of a rechargeable lithium battery uses non-aqueous electrolyte, but a trace of water may be included in the electrolyte. The water reacts with a lithium salt such as $LiPF_6$ in the electrolytes to produce a strong acid, HF. HF attack to Mn presented in a surface of the manganese-based active material and Mn is dissolved in the electrolyte. As a result, the active material is disintegrated. Due to this problem, the cycle life characteristics, particularly, at high temperatures is remarkably reduced. Whereas, since the positive active material of the present invention includes semi-metals having good reactivity with HF, the semi-metals reacts with HF such that HF unable to attack Mn. Accordingly, Mn is not eluted into the electrolyte and the active material is not disintegrated.

Accordingly, a rechargeable lithium battery with the positive active material of the present invention exhibits improved discharge capacity and good cycle life at high C-rate, particularly at high temperature.

The following examples further illustrate the present invention.

EXAMPLE 1

LiOH, $MnO_2$ and $SiO_2$ were weighed in the mole ratio of 1.0/1.99/0.01 and those compounds were poured into a mortar. Ethanol of sufficient amount to completely react the mixture was added to the mixture and a mortar grinder-mixing step was performed till the ethanol-free condition is obtained.

The resulting mixture was initially heat-treated at 450° C. for 5 hours under a dry air atmosphere to prepare a semi-crystalline powder. The semi-crystalline powder was re-mixed at room temperature to uniformly distribute lithium salt in the mixture. The re-mixed semi-crystalline powder was again heat-treated at 750° C. for 12 hours under dry air atmosphere to produce crystalline $LiMn_{1.99}Si_{0.01}O_4$ powder.

The $LiMn_{1.99}Si_{0.01}O_4$ powder was dipped into a Al-isopropoxide with a concentration of 10 wt % and then dried to produce an Al-alkoxide coated $LiMn_{1.99}Si_{0.01}O_4$ powder. The dried material was heat-treated at 900° C. for 10 hours under a dry atmosphere to produce an Al-oxide coated active material.

EXAMPLE 2

A positive active material was produced by the same procedure in Example 1 except that the mole ratio of Li/Mn/Si was 1.0/1.97/0.03.

EXAMPLE 3

A positive active material was produced by the same procedure in Example 1 except that the mole ratio of Li/Mn/Si was 1.0/1.95/0.05.

EXAMPLE 4

A positive active material was produced by the same procedure in Example 1 except that $B_2O_3$ was used and the mole ratio of Li/Mn/B was 1.0/1.99/0.01.

Comparative Example 1

LiOH and $MnO_2$ were weighed in the mole ratio of 1/2. The compounds were uniformly mixed in a mortar. The mixture was heat-treated at 450° C. for 5 hours under a dry air atmosphere to produce semi-crystalline $LiMn_2O_4$ powder. The semi-crystalline $LiMn_2O_4$ powder was re-mixed at room temperature to uniformly distribute lithium salts in the powder. The re-mixed powder was heat-treated at 750° C. for 12 hours where dry air was circulating to produce crystalline active material.

92 wt % of each of active materials according to Examples 1 to 4 and Comparative example was mixed with 4 wt % of Super P carbon as a conductive agent and 4 wt % of KF-1300 polyvinylidene fluoride as a binder. Then N-methylpyrrolidone was added as a solvent to prepare an active material slurry. The slurry was cast into a tape shape to form a positive electrode. The positive electrode was then assembled with a lithium metal foil (counter electrode), and a lithium salt solution is added as an electrolyte to thereby fabricate a coin-cell type half-cell. The lithium salt solution included ethylene carbonate and dimethyl carbonate as a solvent and 1M $LiPF_6$ as a solute.

FIG. 1 is a SEM photograph of the active material according to Example 1. As shown in FIG. 1, the miniscule particles were aggregated to form the active material of Example 1. Furthermore, the SEM of the active materials according to Examples 2 to 4 showed similar result with that of Example 1.

Figure 2:
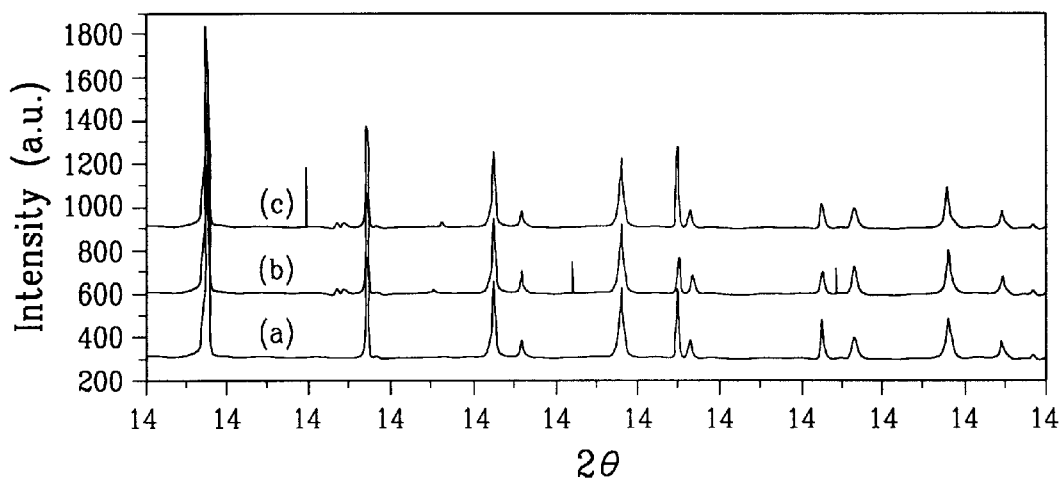
FIG. 2 is an X-ray diffraction (XRD) graph of positive active materials for a rechargeable lithium battery according to Examples and Comparative example of the present invention.

The XRD of the active materials according to Examples 1 and 4, and Comparative example 1 were shown in FIG. 2. As shown in FIG. 2, the active material of Example 1 (c) had a Si peak at about $2\theta=25$, which represents that the active material included Si. The active material of Example 4 (b) had a B peak at about $2\theta=43$, which represent that the active material included B. On other hands, the active material of Comparative example 1 (a) did not have Si or B peak. The active materials according to Examples 2 to 3 had the identical XRD pattern with the active materials Examples 1 and 4.

Figure 3:
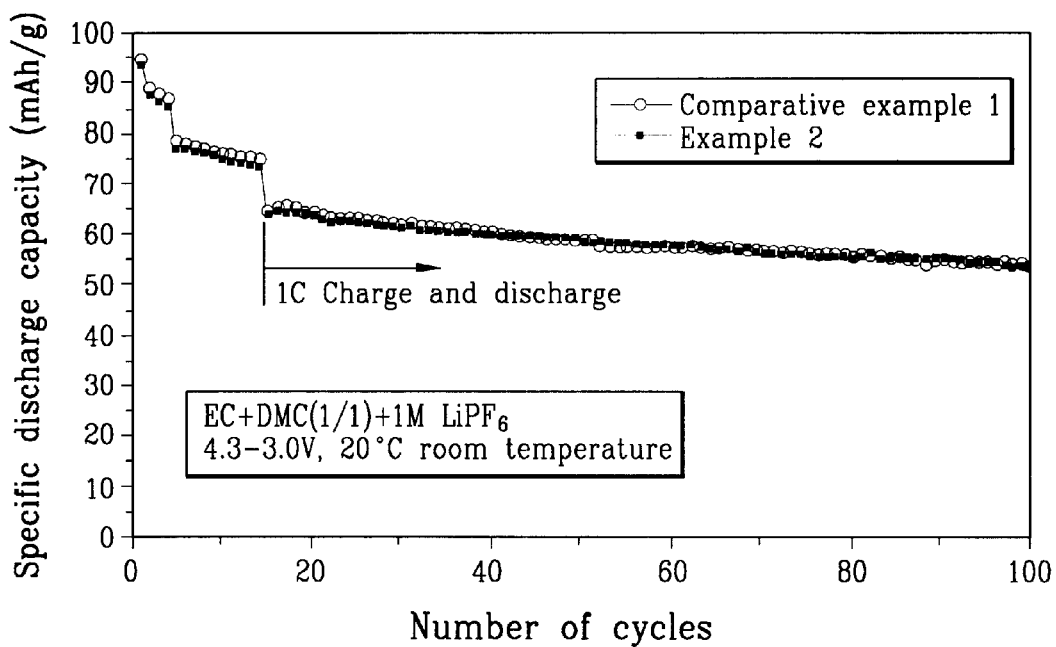
FIG. 3 is a graph illustrating room-temperature charge and discharge cycle life characteristics of positive active materials according to Example and Comparative example of the present invention.

The cycle life characteristics at room temperature of active materials according to Example 2 and Comparative example 1 were measured by repeatedly charging and discharging the cells at 4.3 to 3.0V, to 0.1C for 1 cycle, 0.2C for three cycles, 0.5C for 10 cycles and 1C for 86 cycles. The results are presented in FIG. 3. As shown in FIG. 3, the capacity of the both cells of Example 2 and Comparative example 1 was not reduced at high-rate (1C charge and 1C discharge) and room temperature (25° C.). The results of the cells according to Examples 1, 3 and 4 showed similar result with that of Example 1.

Figure 4:
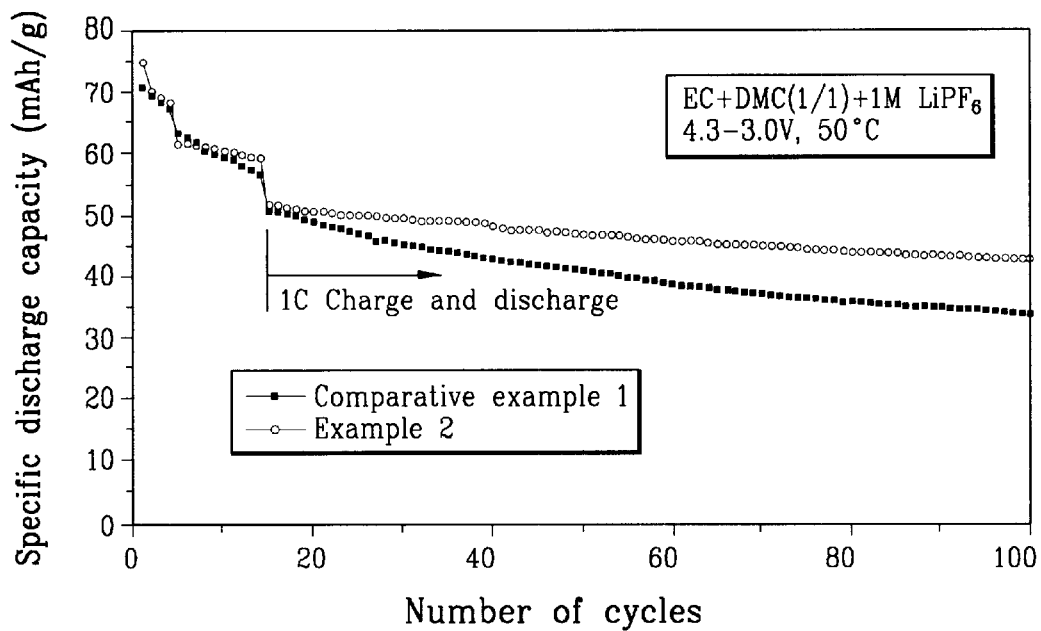
FIG. 4 is a graph illustrating high-temperature charge and discharge cycle life characteristics of positive active material according to Example and Comparative example of the present invention.

However, if charge and discharge cycle life characteristics is measured at high temperature, the capacity of the active material of Example is not reduced and the active material of Comparative example is greatly reduced. For confirming the characteristics, the cycle life characteristics of the cells according to Example 3 and Comparative example 1 were measured by charging and discharging the cells at 4.3V and 3.0, to 0.1C for 1 cycle, 0.2 for 3 cycles, 0.5C for 10 cycles and 1C for 86 cycles. The results are shown in FIG. 4. As shown in FIG. 4, the capacity of the cell using the active material of Example 3 reduced by about 14.9% after 86 cycles at high-rate (1C charge and discharge) and high temperature (50° C.). Namely, the capacity maintenance was 86.1%. Whereas, the capacity of the cell using the active material of Comparative example 1 is reduced by about 29.9% at high-rate (1C charge and discharge) and high temperature. Namely, the capacity maintenance was about 70.1%. Accordingly, the active material of the present invention has structural stability at high temperature and high rate (1C charge and discharge) than the conventional active material and has a limited amount capacity reduction as well as good cycle life. The results of the active materials according to Examples 1, 2 and 4 showed similar result with that of Example 1.

Figure 5:
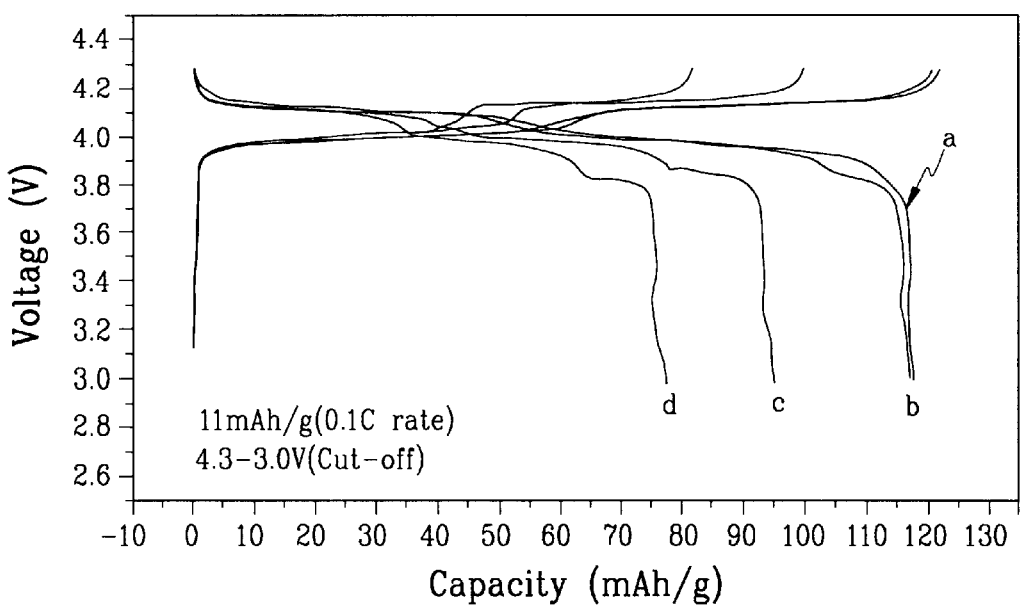
FIG. 5 is a graph illustrating charge and discharge characteristics of positive active materials according to Example and Comparative example of the present invention.

The initial charge and discharge characteristics of the active materials according to Examples 1–3 and Comparative example 1 were measured and the results are presented in FIG. 5. In FIG. 5, Example 1 indicates a symbol b, Example 2 indicates a symbol c, Example 3 indicates a symbol d and Comparative example 1 indicates a symbol a. As shown in FIG. 5, although the cell of Comparative example 1 had largest initial charge and discharge capacity, the cycle life of Comparative example 1 was less than those of Examples due to the remarkable capacity reduction at high temperature. As the Si content is increased, initial charge and discharge capacity is reduced. It is shown that the excess Si are undesirable.

The positive active material of the present invention has good cycle life at high temperature.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a rechargeable lithium battery comprising:

a manganese-based compound selected from the group consisting of compounds represented by formulas 1 to 6; and a metal oxide coated on the manganese-based compound, $$Li_xMn_{1-x}M'_xA_2 \qquad (1)$$

$$Li_xMn_{1-x}M'_xO_{2-z}A_z \qquad (2)$$

$$Li_xMn_{1-x-y}M'_xM''_yA_2 \qquad (3)$$

$$Li_xMn_{2-x}M'_xO_4 \qquad (4)$$

$$Li_xMn_{2-x}M'_xO_{4-z}A_z \qquad (5)$$

$$Li_xMn_{2-x-y}M'_xM''_yA_4 \qquad (6)$$

(where, $0.01 \leq x \leq 0.1$, $0.01 \leq y \leq 0.1$, $0.01 \leq z \leq 0.5$, M' is at least one semi-metal selected from the group consisting of Si, B, Ti, Ga, Ge and Al, M" is at least one transition metal or lanthanide metal selected from the group consisting of Al, Cr, Co, Mg, La, Ce, Sr and V, and A is selected from the group consisting of O, F, S and P.

2. The positive active material for a rechargeable lithium battery of claim 1 wherein the metal is selected from the group consisting of Al, Co, K, Na, Ca, Si, Ti and V.

3. The positive active material for a rechargeable lithium battery of claim 1 wherein the thickness of the metal oxide coating is 1 to 100 nm.

4. A method of preparing a positive active material for a rechargeable lithium battery, the positive active material coated with metal oxide, the method comprising the steps of:

preparing a powdery manganese-based material, the powdery manganese-based material being selected from the group consisting of the formulas 1 to 6;

coating the powdery manganese-based material with a metallic alkoxide solution or metal aqueous solution; and heat-treating the coated powdery manganese-based material such that the coated powdery manganese-based material is converted into a metal oxide-coated powder, $$Li_xMn_{1-x}A_2 \qquad (1)$$

$$Li_xMn_{1-x}M'_xO_{2-z}A_z \qquad (2)$$

$$Li_xMn_{1-x-y}M'_xM''_yA_2 \qquad (3)$$

$$Li_xMn_{2-x}M'_xO_4 \qquad (4)$$

$$Li_xMn_{2-x}M'_xO_{4-z}A_z \qquad (5)$$

$$Li_xMn_{2-x-y}M'_xM''_yA_4 \qquad (6)$$

(where, $0.01 \leq x \leq 0.1$, $0.01 \leq y \leq 0.1$, $0.01 \leq z \leq 0.5$, M' is at least one semi-metal selected from the group consisting of Si, B, Ti, Ga, Ge and Al, M" is at least one transition metal or lanthanide metal selected from the group consisting of Al, Cr, Co, Mg, La, Ce, Sr and V, and A is selected from the group consisting of O, F, S and P.

5. The method of claim 4 wherein the heat-treating step is performed at 300 to 1000° C. under air or oxygen atmosphere.

6. The method of claim 4 wherein the heat-treating step is performed for 2 to 20 hours.

* * * * *